(No Model.)

J. DOYLE.
SOLDERING IMPLEMENT.

No. 249,229. Patented Nov. 8, 1881.

Witnesses—
Robert W. Matthews
Chas. H. Doyat

Inventor—
John Doyle,
per:
James A. Whitney
Atty.

UNITED STATES PATENT OFFICE.

JOHN DOYLE, OF HOBOKEN, NEW JERSEY, ASSIGNOR OF ONE-HALF TO
C. COLES DUSENBURY, OF WHITE PLAINS, NEW YORK.

SOLDERING IMPLEMENT.

SPECIFICATION forming part of Letters Patent No. 249,229, dated November 8, 1881.

Application filed January 29, 1881. (No model.)

*To all whom it may concern:*

Be it known that I, JOHN DOYLE, of Hoboken, in the county of Hudson and State of New Jersey, have invented certain Improvements in Soldering Implements, of which the following is a specification.

In the use of the ordinary "soldering-iron," so called, it is essential that the copper tip should be "tinned," as it is termed, in order that it may operate effectually in the operation of soldering; and inasmuch as the tin is liable to be burned off every time the tip is heated, it follows that much time and labor is expended in retinning the tip. It has been proposed to avoid this source of loss and inconvenience by means of a removable tip so applied to the body of the implement that the tip may be brought away from the body of the implement while said body is being heated, so that when the tip is replaced it will itself be heated by caloric communicated from the body, the tinned coating of the tip having meanwhile been kept intact.

It is to this last indicated class of apparatus that my invention belongs; and its object is to provide a soldering implement of the general character thus indicated, which in its construction and operation will be more effective in use and capable of more convenient manipulation than any previously produced.

To this end my invention comprises certain novel and useful combinations of parts, hereinafter more definitely particularized.

Figure 1:
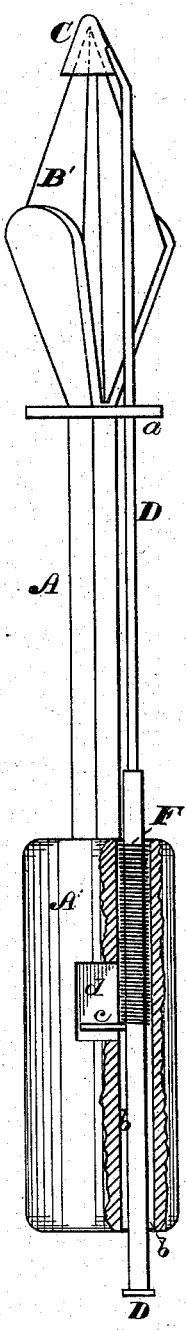
Figure 2:
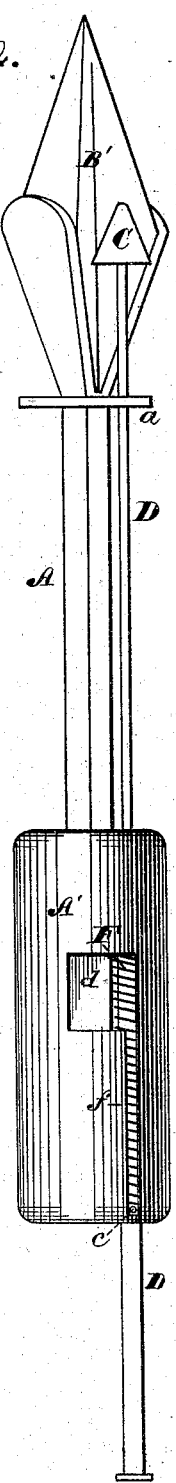

Figure 1 is a side view and partial section of a soldering implement embracing the several features of my said invention, and showing the implement with the tip applied in place for use in the operation of soldering. Fig. 2 is a similar view representing the implement with the tip removed to permit the heating of the body, from which heat is communicated to the tip when the implement is applied to use.

A is the shank of the implement, to one end of which is attached a handle, A', and to the opposite end of which is attached a block, B', of copper or other suitable metal, which I term the "body" of the implement, the said block or body B' being of any suitable size and configuration.

C is the tip, which answers to the tip or pointed extremity of the ordinary soldering-iron, and which is externally tinned in substantially the same manner as the aforesaid tip or extremity of the ordinary soldering-iron. This tip C is made preferably of cat-like or concavo-convex shape, in order that it may fit snugly upon the pointed end of the body B'. The tip C is fixed at one edge to the outer end of a rod, D, which is placed parallel with the shank A of the soldering-iron, and passed through one or more guides, $a$, provided to and projecting laterally from the said shank. The innermost end of the rod D passes through a socket, $b$, formed in the handle A', there being placed around the said rod a spring, F, which, bearing at one end against the adjacent end of the socket $b$ and at the other against a shoulder formed on the rearmost extremity of the rod D, tends to retract or draw backward the said rod.

Projecting laterally from the rod is a long stud, $c$, which rests against a bearing, $d$, formed upon the handle and substantially parallel in direction with the shank A.

The rod D extends backward beyond the outer extremity of the handle, so that by pressing the rearwardly-projecting end of the said rod against any suitable resisting support—as, for example, the knee of the operator, a bench, or the like—the rod D may be pushed forward to bring the tip C coincident with the end of the body B', so that by then simply releasing the pressure against the end of the rod D the retractive action of the spring will draw the tip C down upon the extremity of the body B', as represented in Fig. 1, the tip being thus snugly held upon the body B', and constituting the soldering-tip thereof, inasmuch as its tinned external surface bears the same relation to the body B' that the ordinary tip of the common soldering-iron bears to the mass of metal behind it. The body B', when heated, transmits heat to the tip C, and raises the latter to a temperature sufficient for all the purposes of soldering, and inasmuch as the tip C is brought away from the body B' while the latter is being heated, it follows that the tinned surface of the tip C is not injured during the operation of heating the body B', so that the destruction of the tinned soldering-surface of the implement is fully and entirely avoided. In the backward movement of the rod D, as just hereinbefore explained, the stud c passes back into a slot, f, communicating from the socket b, to permit this backward movement of the stud. By simply pushing forward the rod D, as hereinbefore explained, and then with the thumb or forefinger turning the stud c, so as to give partial rotation to the rod D, the tip C is swung around out of line with the body B', so that by simply relieving from pressure the end of the rod D the spring retracts the latter and brings the tip C down behind the body B' into the position represented in Fig. 2, thereby leaving the body entirely clear, so that the body B' may be heated in the ordinary manner without any contact of the heating-flame with the tip C, so that the tinned surface of the latter is kept away from the heat to an extent sufficient to avoid any burning, oxidation, or injurious action of the heat upon said tinned surface, from which it follows that when the tip is replaced upon the body B', as hereinbefore explained, the said tip is intact and ready for immediate use, the implement during the soldering operation being handled and managed in precisely the same manner as an ordinary soldering-iron.

It will be observed that by the several combinations of parts herein described the manipulation of the removable tip, both in placing the same upon the body B' and removing the same from the said body, is rendered comparatively easy by the action of the same hand of the operator which grasps the implement in the ordinary operation of soldering.

It will also be observed that the tip C, when removed from the body B', as hereinbefore explained, is yet retained in such relation therewith as to be prevented from falling to a temperature low enough to impair its immediate action for soldering purposes when brought into position upon the body B'.

What I claim as my invention is—

1. In a soldering implement, the combination of the body B' on the shank A, the rod D, placed in bearings on the shank A and capable of both a longitudinal and axial movement, the tip C, attached to the rod D, in close proximity to the body B', the spring F, applied to the rod D, and handle A', having an abutment against which the spring acts to force down the cap, all substantially as and for the purpose herein set forth.

2. In a soldering apparatus, the combination, with the body B', shank A, and handle A', of the rigid rod D, capable of a combined longitudinal and axial movement, carrying the tips C at one end, and with its opposite end projected beyond the handle, substantially as and for the purpose herein set forth.

3. In a soldering implement, the combination of the body B', having the shank A, the handle A', having socket b, the rod D, placed in guides on the shank, and having the tip C at one end, and its opposite end passed through the socket b to and beyond the outer end of the handle, the stud c on the rod D, and the bearing d on the handle, all substantially as and for the purpose herein set forth.

JOHN DOYLE.

Witnesses:
  CHAS. H. DOXAT,
  ROBERT W. MATTHEWS.